United States Patent [19]

Drent

[11] Patent Number: 4,921,937

[45] Date of Patent: May 1, 1990

[54] TERPOLYMER FROM OLEFIN AND CARBON MONOXIDE AND PREPARATION THEREOF

[75] Inventor: Eit Drent, Cm Amsterdam, Netherlands

[73] Assignee: Shell Oil Company, Houston, Tex.

[21] Appl. No.: 267,142

[22] Filed: Nov. 4, 1988

[30] Foreign Application Priority Data

Nov. 4, 1987 [NL] Netherlands .................. 8702633

[51] Int. Cl.$^5$ .................................. C08G 67/02
[52] U.S. Cl. ............................ 528/392; 528/271
[58] Field of Search .......................... 528/392, 271

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 CQ |
| 3,835,123 | 9/1974 | Nozaki | 260/949 B |
| 3,984,388 | 10/1976 | Shryne et al. | 260/63 CQ |
| 4,740,625 | 4/1988 | Drent | 568/387 |
| 4,788,279 | 11/1988 | Drent | 528/392 |
| 4,818,811 | 4/1989 | Drent | 528/392 |
| 4,849,496 | 7/1989 | Watanabe et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 5/1987 | European Pat. Off. . |
| 229408 | 7/1987 | European Pat. Off. . |
| 251373 | 1/1988 | European Pat. Off. . |
| 257663 | 3/1988 | European Pat. Off. . |
| 1081304 | 8/1967 | United Kingdom . |

*Primary Examiner*—Harold D. Anderson
*Attorney, Agent, or Firm*—Dean F. Vance

[57] ABSTRACT

Contacting carbon monoxide, at least one α-olefin, and at least one mono-olefin with non-terminal carbon-carbon double bonds or mono-ethylinically unsaturated compound with both non-terminal double bonds and one or two carbonyloxy groups in the presence of a catalyst composition formed by contacting a palladium compound, the anion of an acid having a pKa less than 6 and a bidentate phosphorus or nitrogen ligand results in the production of novel polyketone terpolymers.

19 Claims, No Drawings

TERPOLYMER FROM OLEFIN AND CARBON MONOXIDE AND PREPARATION THEREOF

This invention relates to a process for the preparation of polymers of carbon monoxide with one or more α-olefins and wih one or more other mono-olefinically unsaturated compounds.

Polymers of carbon monoxide and one or more ethylenically unsaturated hydrocarbons are well known. Such polymers contain carbonyl groups in the polymer backbone and are known as polyketones. The polymers are useful in part because at least a portion of the carbonyl groups can be converted by conventional chemical reactions into other functional groups, e.g., conversion into polyamines by reaction with ammonia and conversion into polyols by catalytic hydrogenation. The polyketone polymers independently have utility as will be described.

The carbon monoxide polymers produced by polymerization of carbon monoxide and ethylenically unsaturated hydrocarbons such as ethylene are generally high molecular weight linear alternating polymers having one unit of carbon monoxide per unit of hydrocarbon. The polymers are typically produced employing a catalyst comprising certain Group VIII metal compounds, e.g., a palladium compound, an anion of an acid with a pKa less than 6, and a bidentate phosphorus ligand having the general formula $R_1R_2P-R-PR_3R_4$ in which $R_1$ to $R_4$ represent hydrocarbyl groups optionally substituted by polar groups and R represents a divalent organic bridging group having at least two carbon atoms in the phosphorus-phosphorus bridge. When the olefinically unsaturated hydrocarbon is ethylene, the polymers are inexpensive and provide good mechanical properties of strength, stiffness and impact resistance. The carbon monoxide and ethylene copolymers have high melting points which can be reduced by the inclusion of another α-olefin in the polymerization mixture. Lower mono-olefins such as propylene and 1-butene, as well as higher mono-olefins such as 1-dodecene, can be used for that purpose. Compounds which have terminal carbon-carbon double bonds and also include carbonyloxy groups linked directly, or by a hydrocarbyl bridge, to the non-terminal carbon atom participating in the double bond, such as methyl acrylate and 10-undecenoic acid, can also be polymerized with the carbon monoxide and ethylene to reduce the melting point. Effective reduction of the melting point generally requires that the average number of $-CO-C_2H_4-$ units per other units be less than 1000. In other words, at least one molecule of the compounds having a terminal double bond should be polymerized for every 1000 ethylene molecules that are polymerized. Since the polymers are linear alternating, the number of carbon monoxide molecules that are polymerized should roughly equal the number of ethylene and other molecules that are polymerized.

Attempts to incorporate compounds having non-terminal carbon-carbon double bonds into alternating polymers of carbon monoxide and an α-olefin were unsuccessful using the above-described catalyst composition. The best attempts resulted in polymerization of one molecule of compounds having the non-terminal double bond for about every 2000 molecules of the α-olefin.

SUMMARY OF THE INVENTION

The present invention relates to certain novel polymers and to a process of producing the polymers. More particularly, the polymers to which the invention relates are polymers of carbon monoxide, at least one α-olefin, and at least one mono-olefin having a non-terminal carbon-carbon double bond or mono-olefinically unsaturated compound having a non-terminal carbon-carbon double bond and having one or two carbonyloxy groups. The polymers are linear alternating polymers of carbon monoxide with other monomers, the polymers having primarily units of the tupe —CO—(A)— wherein A is a polymer component resulting from polymerization of the α-olefin, and randomly distributed units of the type —CO—(B)— wherein B is a polymer component resulting from polymerization of a compound having a non-terminal carbon-carbon double bond. In the polymers of the invention, there are on the average fewer than 1000 of the units —CO—(A)— for each of the units —CO—(B)— in the polymer molecules. Preferably there are fewer than 750 of the units containing component A for each unit containing component B, and more preferably fewer than 500.

Both polymer components A and B preferably contain less than 10 carbon atoms and preferably only one component A and one component B is used to produce the polymer. Preference is given to ethylene for producing component A and to 2-butene for producing component B, resulting in a polymer having primarily units of $-CO-CH_2-CH_2-$ and randomly distributed units of $-CO-CH(CH_3)-CH(CH_3)-$.

The polymers of the present invention are produced by contacting the monomers in the presence of a catalyst composition comprising a palladium compound, an anion of an acid having a pKa less than 4, and a ligand having the general formula

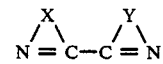

wherein X and Y independently are bridging groups of from 2 to 10 carbon atoms inclusive with from 3 to 4 atoms in the bridge, at least two of which are carbon atoms with any other atoms in the bridge being nitrogen atoms.

DESCRIPTION OF THE INVENTION

The polymers of the invention are linear alternating polymers of carbon monoxide with other monomers, the polymers having primarily units of the type —CO—(A)— wherein A is a polymer component resulting from polymerization of the α-olefin, and randomly distributed units of the type —CO—(B)— wherein B is a polymer component resulting from polymerization of a compound having a non-terminal carbon-carbon double bond. In the polymers of the invention, there are on the average fewer than 1000 of the units —CO—(A)— for each of the units —CO—(B)— in the polymer molecules. Preferably there are fewer than 750 of the units containing component A for each unit containing component B, and more preferably fewer than 500.

The α-olefins employed to produce the units containing component A have from 2 to 20, but preferably 2 to 10, carbon atoms inclusive. Useful α-olefins are ethylne, propylene, and 1-butene. Polymerization is most easily accomplished when a single α-olefin is employed and particularly useful is ethylene.

The mono-olefinically unsaturated compounds employed to provide the units containing component B have from 4 to 20 carbon atoms, preferably from 4 to 10 carbon atoms, inclusive. Useful mono-olefins having a non-terminal carbon-carbon double bond include 2-butene, 2-pentene, 2-hexene, 2-octene, 2,7-dimethyl-4-octene, cyclopentene, and cyclohexene. Polymerization is most easily accomplished when a single mono-olefin having a non-terminal double bond is employed and particularly useful is 2-butene. Examples of useful compounds having non-terminal carbon-carbon double bonds and having one or two carbonyloxy groups are unsaturated monocarboxylic acids such as crotonic acid, alkyl esters of the unsaurated monocarboxylic acids such as methylcrotonate and methyl-3-penteneoate, unsaturated dicarboxylic acids such as maleic acid and fumaric acid, monoalkylesters of the unsaturated dicarboxylic acids such as dimethylmaleate, dimethylfumarate, and dimethyl-3-hexenedioate, anhydrides of the unsaturated dicarboxylic acids such as maleic anhydride, and lactones of unsaturated hydroxymonocarboxylic acids such as the lactone of τ-hydroxycrotonic acid. Polymerization is most easily accomplished when a single compound having a non-terminal double bond and one or two carbonyloxy groups is employed and particularly useful is maleic anhydride.

If the monoethylinically unsaturated compounds having the carbonyloxy groups are included in the polymerization, the resulting polymers will have carbonyloxy groups as well as carbonyl groups. These carbonyloxy groups (—CO—O—), like the carbonyl groups (—CO—), can be converted at least partly into other functional groups by means of chemical modification. For example, carboxylic acid ester groups which can occur in the polymers can be converted by saponification into carboxyl groups.

The polymers of the present invention are produced by contacting the monomers in the presence of a catalyst composition comprising a palladium compound, an anion of an acid having a pKa less than 4, and a ligand having the general formula

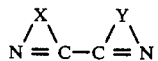

wherein X and Y independently are bridging groups of from 2 to 10 carbon atoms inclusive with from 3 to 4 atoms in the bridge, at least two of which are carbon atoms with any other atoms in the bridge being nitrogen atoms.

The palladium compound employed in the catalyst compositions is preferably a palladium salt of a carboxylic acid and in particular is palladium acetate.

The anion of an acid having a pKa less than about 4 (measured in aqueous solution at 18° C.), includes the anion of mineral acids including perchloric acid, sulfuric acid, phosphoric acid, and nitrous acid, the anion of sulfonic acid including methansulfonic acid, trifluoromethanesulfonic acid, 2-hydroxypropane-2-sulfonic acid, and para-toluenesulfonic acid, and the anion of carboxylic acids including trichloroacetic acid, dichloroacetic acid, trifluoroacetic acid, difluoroacetic acid, tartaric acid, and 2,5-dihydroxybenzoic acid. Anions of acids having a pKa less than 2 are preferred and in particular anions of sulfonic acids or carboxylic acids, such as para-toluenesulfonic acid or trifluoroacetic acid, respectively.

The anion of the acid is preferably present in the catalyst composition in an amount from about 0.5 to about 200 equivalents per gram atom of palladium and preferably from about 1 to about 100 equivalents per gram atom of palladium. The anion is provided as the acid or as a salt of a non-noble transition metal such as zirconium, vanadium, chromium, iron, nickel, copper or zinc. When the anion is provided as the salt of a non-noble transition metal, a copper salt is preferred. Optionally, the palladium compound and the anion of the acid can be supplied as a single compound such as palladium para-tosylate, having the formula $Pd(CH_3CN)_2(O_3S—C_6H_4—CH_3)_2$, which is prepared by reaction of palladium chloride with the silver salt of para-toluenesulfonic acid in acetonitrile as the solvent or by reaction of palladium acetate and para-toluenesulfonic acid in acetonitrile as solvent.

The bidentate nitrogen ligands useful in the invention are ligands of the formula

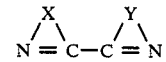

wherein X and Y independently are bridging groups of from 2 to 10 carbon atoms inclusive with from 3 to 4 atoms in the bridge, at least two of which are carbon atoms with any other atoms in the bridge preferably being nitrogen atoms. In addition to the carbon-carbon connection shown in the formula, the bridging groups X and Y may also have a second linkage, as in the case of 1,10-phenantroline and compounds derived therefrom. Preference is given to nitrogen bidentate ligands in which the bridging groups X and Y are similar.

Examples of such bidentate nitrogen ligands are 2,2'-bipyridine and compounds derived therefrom, such as 4,4'-dimethyl-2,2'-bipyridine, 4,4'-dichloro-2,2'-bipyridine, 4,4'-dimethoxy-2,2'-bipyridine, and 4,4'-dicarboxy-2,2'-bipyridine.

Further examples of suitable nitrogen bidentate ligands are the 1,10-phenantrolines, such as 5-chloro-1,10-phenantroline, 4,7-diphenyl-1,10-phenantroline, 4,7-dimethyl-1,10-phenantroline, 2,9-dichloro-1,10-phenantroline, 1,10-phenantroline-5-sulfonic acid, and 4,7-dphenyl-1,10-phenantroline disulfonic acids.

Examples of other nitrogen ligands are 2,2'-biquinilone, 2-(2-pyridyl)benzimidazole, and 3-(2-pyridyl)-5,6-diphenyl-1,2,4-triazine.

The preferred bidentate nitrogen ligands are 2,2'-bipyridine and its derivatives and 1,10-phenanthroline and its derivatives which are used in the catalyst composition in a quantity from about 0.5 mol to about 200 mol per mol of palladium compound, with quantities from about 1 mol to about 50 mol per mol of palladium compound being preferred. The preferred nitrogen ligands are 2,2'-bipyridine and 1,10-phenanthroline.

It is preferred, but not required to add an organic oxidizing agent to the catalyst composition to enhance catalyst activity. Useful oxidizing agents are 1,2-quinones, 1,4-quinones, aliphatic nitrites such as methyl nitrite, ethyl nitrite, propyl nitrite, and butyl nitrite, aromatic nitro compounds such as nitrobenzene, nitrotoluene, and nitrochlorobenzene, and peroxides such as di-tert.-butylperoxide and dicumylperoxide. Quinones are preferred, particularly 1,4-benzoquinone and 1,4- naphthoquinone. The quantity of oxidizing agent used is preferably 1 to 10,000 moles per gram atom of palladium, most preferably 10 to 5,000 moles per gram atom.

The catalyst composition useful in the process of the invention is employed in quantities from about $1 \times 10^{-7}$ mol to about $1 \times 10^{-3}$ gram atom of palladium per mol of the olefinically unsaturated compounds with quantities containing from about $1 \times 10^{-6}$ to about $1 \times 10^{-4}$ gram atom of palladium per mol of the unsaturated compounds being preferred.

The method of contacting the catalyst composition and the monomers is not critical but is preferably conducted in the liquid phase in a diluent in which the polymer is insoluble or virtually insoluble. Inert solvents include lower alcohols such as methanol and ethanol. The polymerization may be carried out either batchwise or continuous, and may be conducted in a gas phase.

In a typical polymerization, conditions employed include reaction temperatures from about 20° C. to about 200° C., preferably from about 30° C. to about 150° C. Typical reaction pressures vary from about 1 to about 200 bar, preferably from about 20 to about 100 bar. The molar ratio of the olefinically unsaturated compounds relative to carbon monoxide in the mixture to be polymerized is preferably from 10:1 to 1:5, and most preferably from 5:1 to 1:2. The carbon monoxide used in the polymerization may contain contaminants such as hydrogen, carbon dioxide, and nitrogen. The mechanical form of the reactor is not critical provided it maintains the desired polymerization conditions of temperature and pressure. Subsequent to polymerization, the terpolymer product is recovered by conventional means such as filtration or decantation.

The polymers of the invention have good mechanical properties. They are processed by conventional means into films, sheets, plates, fibers and molded objects. The polymers of relatively low molecular weight are useful in the production of plastics, as, for example, as components in blends with other hydrocarbon plastics useful in waxes and greases or plasticizers for other polymers. The higher molecular polymers have utility as premium grade thermoplastics for films, fibers and articles prepared by injection molding, compression molding or blow molding. These polymers are useful in the production of load-bearing parts in the automotive industry, in the production of packaging materials in the food and beverage industry and as construction and building material. The polymeric materials are useful alone or in combination with other conventional blending materials.

The invention will now be further illustrated with the aid of the following comparative examples and illustrative embodiments.

COMPARATIVE EXAMPLE I

A carbon monoxide/ethylene/1-butene terpolymer was prepared by charging 180 ml of methanol and 20 ml of liquified 1-butene to a magnetically stirred autoclave of 300 ml capacity. After the contents of the autoclave had been heated to 85° C., a 1:1 carbon monoxide and ethylene mixture was introduced under pressure until a pressure of 55 bar was reached. A catalyst solution was then introduced comprising 6 ml of methanol, 0.01 mmol of palladium acetate, 0.2 mmol of trifluoroacetic acid, and 0.01 mmol of 1,3-bis(diphenylphosphino)propane. The pressure in the autoclave was maintained by introducing additional amounts of the 1:1 carbon monoxide and ethylene mixture. After 5 hours the polymerization was terminated by cooling to room temperature and releasing pressure. The polymer was filtered, washed with methanol and dried at 70° C.

The product, 24 g of terpolymer, was found to contain an average of 143 of the —CO—$(C_2H_4)$— units for each of the —CO—$CH_2$—$CH(C_2H_5)$— units.

COMPARATIVE EXAMPLE II

A carbon monoxide/ethylene/1-dodecene terpolymer was prepared by charging 180 ml of methanol and 78 ml of 1-dodecene to a magnetically stirred autoclave of 300 ml capacity. After the contents of the autoclave had been heated to 65° C., a 1:1 carbon monoxide and ethylene mixture was introduced under pressure until a pressure of 55 bar was reached. A catalyst solution was then introduced comprising 18 ml of methanol, 0.03 mmol of palladium acetate, 0.06 mmol of copper para-tosylate, 0.036 mmol of 1,3-bis(diphenylphosphino)propane, and 0.3 mmol of 1,4-benzoquinone. The pressure in the autoclave was maintained by introducing additional amounts of the 1:1 carbon monoxide and ethylene mixture. After 3 hours the polymerization was terminated by cooling to room temperature and releasing pressure. The polymer was filtered, washed with methanol and dried at 70° C.

The product, 20 g of terpolymer, was found to contain an average of 23 of the —CO—$(C_2H_4)$— units for each of the —CO—$CH_2$—$CH(C_{10}H_{21})$— units.

COMPARATIVE EXAMPLE III

A carbon monoxide/ethylene/methylacrylate terpolymer was prepared by charging to a magnetically stirred autoclave of 250 ml capacity, a catalyst composition solution comprising 40 ml of methanol, 0.1 mmol of palladium acetate, 2 mmol of copper para-tosylate, and 0.15 mmol of 1,3-bis(diphenylphosphino)propane. After 20 ml of methylacrylate was introduced to the autoclave, air present in the autoclave was evacuated. Then carbon monoxide was introduced under pressure until a pressure of 25 bar was reached, and subsequently ethylene under pressure was added until a total pressure of 50 bar was reached. The contents of the autoclave were heated and maintained at 90° C. After 5 hours the polymerization was terminated by cooling to room temperature and releasing pressure. The polymer was filtered, washed with methanol, and dried under vacuum at room temperature.

The product, 8.2 g of terpolymer, was found to contain an average of 23 of the —CO—$(C_2H_4)$— units for each of the polymerized carbon monoxide/methylacrylate units.

COMPARATIVE EXAMPLE IV

A terpolymer of carbon monoxide/ethylene/methyl ester of 10-undecenoic acid was prepared by the procedures of Comparative Example III except that (a) 30 ml of the methyl ester of 10-undecenoic acid was introduced to the autoclave instead of methylacrylate, and (b) the reaction time was 30 minutes.

The product, 7.1 g of terpolymer, was found to contain an average of 22 of the —CO—$(C_2H_4)$— units for each of the polymerized carbon monoxide/methy ester of 10-undecenoic acid units.

COMPARATIVE EXAMPLE V

A carbon monoxide/ethylene/10-undecenoic acid terpolymer was prepared by charging to a magnetically stirred autoclave of 250 ml capacity, a catalyst composition solution comprising 50 ml of methanol, 0.1 mmol of palladium acetate, 2 mmol of trifluoroacetic acid, and 0.15 mmol of 1,3-bis(diphenylphosphino)propane. After 20 ml of 10-undecenoic acid was introduced to the autoclave, air present in the autoclave was evacuated. Then carbon monoxide was introduced under pressure until a pressure of 30 bar was reached, and subsequently ethylene under pressure was added until a total pressure of 50 bar was reached. The contents of the autoclave were heated and maintained at 80° C. After 5 hours the polymerization was terminated by cooling to room temperature and releasing pressure. The polymer was filtered, washed with methanol, and dried under vacuum at room temperaure.

The product, 20.6 g of terpolymer, was found to contain an average of 60 of the $-CO-(C_2H_4)-$ units for each of the polymerized carbon monoxide/10-undecenoic acid units.

COMPARATIVE EXAMPLE IV

A carbon monoxide/ethylene/maleic anhydride terpolymer was prepared by charging to a magnetically stirred autoclave of 250 ml capacity, a catalyst composition solution comprising 30 ml of methanol, 40 ml of tetrahydrofuran, 0.1 mmol of palladium acetate, 2 mmol of copper para-tosylate, and 0.15 mmol of 1,3-bis(diphenylphosphino)propane. After 10 ml of maleic anhydride was introduced to the autoclave, air present in the autoclave was evacuated. Then carbon monoxide was introduced under pressure until a pressure of 30 bar was reached, and subsequently ethylene under pressure was added until a total pressure of 45 bar was reached. The contents of the autoclave were heated and maintained at 90° C. After 5 hours the polymerization was terminated by cooling to room temperature and releasing pressure. The polymer was filtered, washed with methanol, and dried under vacuum at room temperature.

The product, 8.5 g of terpolymer, was found to contain an average of 2,000 of the $-CO-(C_2H_4)-$ units for each of the polymerized carbon monoxide/maleic anhydride units.

ILLUSTRATIVE EMBODIMENT VII

A carbon monoxide/ethylene/maleic anhydride terpolymer was prepared by charging to a magnetically stirred autoclave of 250 ml capacity, a catalyst composition solution comprising 40 ml of tetrahydrofuran, 30 ml of methanol, 0.1 mmol of palladium acetate, 1 mmol of para-toluenesulfonic acid, 3 mmol of 2,2′-bipyridine, and 20 mmol of 1,4-benzoquinone. After 10 ml of maleic anhydride was introduced to the autoclave, air present in the autoclave was evacuated. Then carbon monoxide was introduced under pressure until a pressure of 30 bar was reached, and subsequently ethylene under pressure was added until a total pressure of 45 bar was reached. The contents of the autoclave were heated and maintained at 90° C. After 5 hours the polymerization was terminated by cooling to room temperature and releasing pressure. The polymer was filtered, washed with methanol, and dried under vacuum at room temperature.

The product, 5.7 g of terpolymer, was found to contain an average of 83 of the $-CO-(C_2H_4)-$ units for each of the polymerized carbon monoxide/maleic anhydride units.

COMPARATIVE EXAMPLE VIII

A carbon monoxide/ethylene/2-butene terpolymer was prepared by charging to a magnetically stirred autoclave of 250 ml capacity, a catalyst composition solution comprising 50 ml of methanol, 0.1 mmol of palladium acetate, 0.5 mmol of copper para-tosylate, and 0.15 mmol of 1,3-bis(diphenylphosphino)propane. After air present in the autoclave was evacuated, 10 ml of liquified 2-butene was introduced to the autoclave. Then carbon monoxide was introduced under pressure until a pressure of 30 bar was reached, and subsequently ethylene under pressure was added until a total pressure of 45 bar was reached. The contents of the autoclave were heated and maintained at 80° C. After 1 hour the polymerization was terminated by cooling to room temperature and releasing pressure. The polymer was filtered, washed with methanol, and dried under vacuum at room temperature.

The product, 10.7 g of terpolymer, was found to contain an average of 2000 of the $-CO-(C_2H_4)-$ units for each of the polymerized carbon monoxide/2-butene units.

ILLUSTRATIVE EMBODIMENT IX

A carbon monoxide/ethylene/2-butene terpolymer was prepared by charging to a magnetically stirred autoclave of 250 ml capacity, a catalyst composition solution comprising 40 ml of tetrahydrofuran, 30 ml of methanol, 0.1 mmol of palladium acetate, 1 mmol of para-toluenesulfonic acid, 3 mmol of 2,2′-bipyridine, and 20 mmol of 1,4-benzoquinone. After air present in the autoclave was evacuated, 10 ml of liquified 2-butene was introduced to the autoclave. Then carbon monoxide was introduced under pressure until a pressure of 30 bar was reached, and subsequently ethylene under pressure was added until a total pressure of 45 bar was reached. The contents of the autoclave were heated and maintained at 80° C. After 5 hours the polymerization was terminated by cooling to room temperature and releasing pressure. The polymer was filtered, washed with methanol, and dried under vacuum at room temperature.

The product, 11.6 g of terpolymer, was found to contain an average of 330 of the $-CO-(C_2H_4)-$ units for each of the polymerized carbon monoxide/2-butene units.

With the aid of $^{13}C$-NMR analysis it was established that the terpolymers prepared according to examples I-IX had a linear structure. It was further established that the terpolymers were made up of the units $-CO-(C_2H_4)-$ and units of the formula $-CO-(B)-$ wherein B is the polymer component resulting from polymerization of the third monomer, and that the units occurred randomly within the polymer.

Illustrative Embodiments VII and IX are according to the invention. Comparison of Illustrative Embodiment VII to Comparative Example VI, and comparison of Ilustrative Embodiment IX to Comparative Example VIII demonstrates that the catalyst compositions containing the nitrogen bidentate ligand are superior to the catalyst compositions containing bidentate phosphine ligands with respect to inclusion of mono-olefins with non-terminal carbon-carbon double bonds and mono-ethylinically unsaturated compounds having both non-terminal carbon-carbon bonds and one or two carbonyloxy groups.

Comparative Examples I and II demonstrate the suitability of the phosphine ligands for inclusion of mono-olefins with terminal carbon-carbon double bonds. Comparative Examples III, IV, and V demonstrate the suitability of the phosphine ligands for inclusion of mono-ethylinically unsaturated compounds having both terminal carbon-carbon double bonds and one or two carbonyloxy groups.

What is claimed is:

1. The process of producing a linear, alternating polymer by polymerizing carbon monoxide, at least one α-olefin, and at least one compound selected from a group consisting of 2-butene, 2-pentene, 2-hexene, 2-octene, 2,7-dimethyl-4-octene, cyclopentene, cyclohexene, crotonic acid, methylcrontonate, methyl-3-pentenoate, maleic acid, fumaric acid, dimethylmaleate, dimethylfumarate, dimethyl-3-hexenedioate or maleic anhydride, in the presence of a catalyst composition formed by contacting a palladium compound, the anion of an acid having a pKa less than 4, and a bidentate nitrogen ligand.

2. The process of claim 1 wherein said α-olefin is ethylene.

3. The process of claim 1 wherein carbon monoxide is polymerized with ethylene and 2-butene.

4. The process of claim 1 wherein carbon monoxide is polymerized with ethylene and maleic anhydride.

5. The process of claim 1 wherein the anion is an anion of an acid having a pKa less than 2.

6. The process of claim 5 wherein the acid having a pKa less than 2 is para-toluenesulfonic acid.

7. The process of claim 1 wherein the catalyst composition is further contacted with an organic oxidizing agent.

8. The process of claim 7 wherein the organic oxidizing agent is 1,4-benzoquinone.

9. The process of claim 1 wherein the bidentate nitrogen ligand has the formula

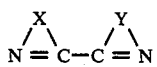

wherein X and Y independently are bridging groups of from 2 to 10 carbon atoms inclusive with from 3 to 4 atoms in the bridge, at least two of which are carbon atoms with any other atoms in the bridge being nitrogen atoms.

10. The process of claim 9 wherein the bidentate nitrogen ligand is 2,2'-bipyridine or 1,10-phenanthroline.

11. The process of claim 10 wherein the bidentate nitrogen ligand is 2,2'-bipyridine.

12. The process of claim 9 wherein the anion of the acid is an anion of an acid having a pKa less than 2.

13. The process of claim 9 wherein the acid having a pKa less than 2 is para-toluenesulfonic acid.

14. The process of claim 9 wherein the catalyst composition is further contacted with 1,4-benzoquinone.

15. Linear alternating polymer of carbon monoxide with other monomers, the polymer consisting essentially of:
   first units of the formula —CO—(A)— wherein A is a polymer unit resulting from polymerization of one or more α-olefins;
   second units of the formula —CO—(B)— wherein B is a polymer unit resulting from polymerization of one or more compounds selected from a group consisting of 2-butene, 2-pentene, 2-hexene, 2-octene, 2,7-dimethyl-4-octene, cyclopentene, cyclohexene, crotonic acid, methylcrotonate, methyl-3-penteneoate, maleic acid, fumaric acid, dimethylmaleate, dimethylfumarate, dimethyl-3-hexenedioate or maleic anhydride; and
   the first and second units being randomly distributed with fewer than 1000 of the first units being present on the average for each second unit that is present.

16. The polymer of claim 15 wherein A results from the polymerization of ethylene.

17. The polymer of claim 16 wherein B is a polymer component resulting from polymerization of 2-butene or maleic anhydride.

18. The polymer of claim 15 wherein fewer than 750 of the first units are present for each second unit.

19. The polymer of claim 15 wherein fewer than 500 of the first units are present for each second unit.

* * * * *